May 29, 1956          A. C. SCINTA          2,747,212
WINDSHIELD WIPER BLADE CONNECTOR
Original Filed May 12, 1947
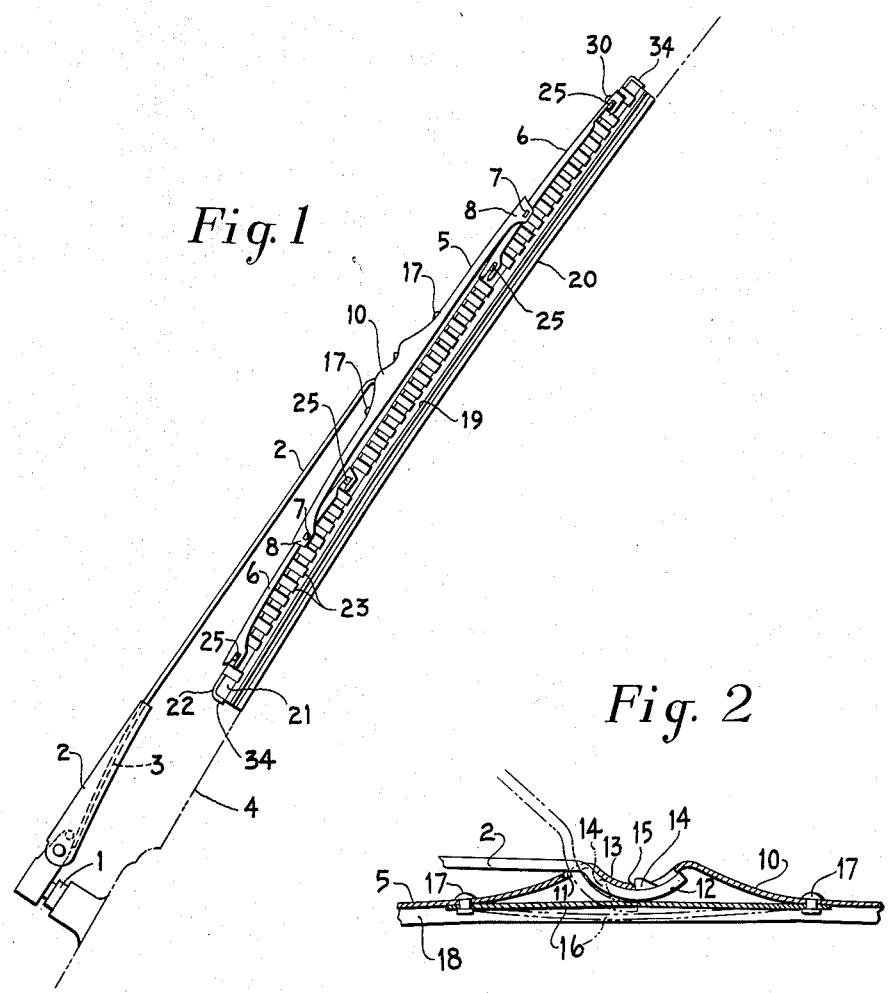
INVENTOR.
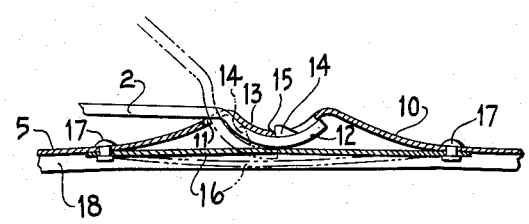
Anthony C. Scinta
BY Bean, Brooks, Buckley + Bean
ATTORNEYS.

_United States Patent Office_ 2,747,212
Patented May 29, 1956

2,747,212

WINDSHIELD WIPER BLADE CONNECTOR

Anthony C. Scinta, Buffalo, N. Y., assignor to Trico Products Corporation, Buffalo, N. Y.

Original application May 12, 1947, Serial No. 747,374, now Patent No. 2,649,605, dated August 25, 1953. Divided and this application January 16, 1953, Serial No. 331,577

6 Claims. (Cl. 15—250)

This invention relates to the windshield cleaning art and has particular reference to an improved attaching clip for detachably securing a wiper to a wiper actuating arm. This application comprises a division of copending application Ser. No. 747,374, filed jointly with Anton Rappl on May 12, 1947.

A primary object of this invention is to provide an improved attaching clip for releasably but securely locking the wiper to a wiper actuating arm, whereby to prevent accidental disconnection thereof.

Another object of this invention is to provide an improved attaching clip formed integrally with the wiper or squeegee holder unit.

A further object of this invention is to provide a practical attaching clip of simplified construction which is relatively inexpensive to manufacture and which is reliable and long-lasting in use.

The foregoing and other objects will manifest themselves as the following description progresses, reference being had to the accompanying drawing, wherein Fig. 1 is a view in side elevation showing a wiper incorporating the attaching clip of the instant invention operatively applied to a curved windshield surface;

Fig. 2 is an enlarged fragmentary longitudinal sectional view showing in detail the improved attaching clip arrangement of this invention.

Referring more particularly to the drawing, the numeral 1 designates an oscillatory drive shaft of the windshield cleaner mechanism on the outer end of which is mounted the wiper actuating arm 2 which includes a flat spring 3 acting to urge the outer end of the arm toward the windshield surface 4 for applying the wiping pressure to the wiper.

The wiper comprises a holder unit incorporating the attaching clip of this invention and a squeegee or wiper unit.

The holder unit is in the form of a flexible linkage or frame and comprises a primary yoke 5 and a plurality of secondary yokes 6 pivotally and loosely connected to the opposite ends of the primary yoke by pivots 7. In the illustrated embodiment the primary yoke is conveniently stamped from sheet metal to provide squeegee straddling ears 8, these ears being formed with apertures to receive the laterally extending pivots 7 of the secondary yokes 6. Furthermore, it will be noted that by stamping out the primary yoke into a channel formation the inner ends of the secondary yokes will nest within the primary channel more or less fully. The secondary yokes also are preferably stamped from sheet metal to provide longitudinally aligned channels for nestingly receiving the squeegee unit. This nesting arrangement provides for compactness and reduces the overall dimension from the wiping edge to the point of arm attachment.

In forming the primary yoke the mid-portion is pressed outwardly to form a hood-like arm attaching clip 10 apertured at 11 to receive the curved tongue 12 at the outer end of the wiper arm. The outer wall 13 of the hood or clip is given an arcuate formation to nestingly receive the tongue 12 where it will be operatively retained by a keeper lug 14 engaging behind a shoulder 15. This interlocking engagement is resiliently maintained by a flat spring 16 which has its opposite ends fixed, as by rivets 17, in the channel 18 of the primary yoke 5. There is sufficient give in the parts to permit the retaining lug 14 to ride over the shoulder 15 when attaching the wiper to its actuating arm.

By reason of its length, spring 16 will give sufficiently to permit lug 14 to ride over shoulder 15, even though spring 16 is fixedly positioned at its opposite ends by rivets 17, as aforesaid. This action of spring 16 during insertion of tongue 12 into clip 10 is illustrated by broken lines in Fig. 2. At the same time, once lug 14 rides over shoulder 15 to engage therebehind, spring 16 is sufficiently strong to urge lug 14 into its full line position illustrated in Fig. 2, and the wiper unit will be thereby firmly retained on arm 2. With this arrangement considerable pressure is required to connect and disconnect clip 10 from arm 2 since spring 16 maintains tongue 12 and wall 13 in closely embraced or nested relation and lug 14 prevents relative outward sliding movement therebetween, and consequently accidental disconnection thereof is effectively prevented.

It will be noted that the attaching clip of this invention comprises relatively few parts, since clip 10 and wall 13 are an integral part of primary yoke 5 and spring 16 is simply riveted to the underside thereof. Thus, the clip is of a simplified construction which can be readily and inexpensively manufactured and assembled. Also, spring 16 is substantially protected by the channel formation of primary yoke 5.

The squeegee unit, as more fully disclosed and claimed in the aforesaid copending application, comprises a rubber-like body 19 having a wiping edge 20 along one margin and an anchoring bead 21 along its opposite margin. The anchoring bead is embraced by a flexible backing strip 22 which has oppositely extending rows of marginal fingers 23 that clampingly grip upon the side faces of the anchoring bead. This backing strip is formed from light metal stock having slight inherent resiliency. At properly spaced points throughout the length of the squeegee unit the backing strip is formed with oppositely extending lugs 25 for interlocking with the opposite end portions of the secondary yokes 6. This interlocked relationship is maintained by a suitable latch, such as the pin 30 on one unit engaging a recess in the companion unit. The rubbery or squeegee body 19 is held against endwise displacement from the gripping fingers 23 of the backing strip 22 by the downturned stops 34.

The details of the squeegee unit per se, and the holder unit apart from the attaching clip, form no part of this invention.

While the foregoing description has been given in detail it is without thought of limitation since the inventive principles involved are capable of assuming other physical embodiments without departing from the spirit of the invention and the scope of the appended claims. Obviously, the attaching clip of this invention can be used with other types of wiper or squeegee units.

Having fully disclosed and completely described this invention, together with its mode of operation, what is claimed is:

1. A windshield cleaner comprising a holder unit having a primary yoke stamped from sheet stock to provide a raised arm attaching clip portion integral therewith intermediate its ends, said clip portion being formed with an arcuate top wall part for nesting into a curved tongue on an actuating arm and with an arm receiving opening adjacent thereto, and a spring member strung across the open lower end of said clip portion in opposition to said arcuate wall part and acting to hold such inserted arm tongue nestingly thereagainst.

2. A windshield cleaner comprising an elongate pressure distributing wiper holder member formed intermediate its ends with a raised arm attaching clip portion, said raised portion being formed along the upper side thereof with an arm receiving opening and with an arcuate wall portion, and a substantially flat leaf spring member bridging the opposite side of said clip portion and secured at its opposite ends to said holder member, said spring member serving to resiliently retain an arm inserted in said opening against said arcuate wall portion.

3. A windshield cleaner comprising an elongate wiper holder member having a continuous wall portion raised intermediate its ends to provide an arm attaching clip housing, said housing having an opening therein through which a wiper-actuating arm can be inserted and an arm receiving wall part, and a substantially flat spring member strung across the lower portion of said housing and attached adjacent its opposite ends to said holder member whereby to bias an arm inserted through said opening against said arm receiving wall part.

4. A windshield wiper comprising a channeled holder member formed intermediate its ends with an integral raised arm attaching portion, said raised portion comprising a chamber defining housing having an arm receiving opening and an arm engaging wall portion, and a spring member confined within said channeled holder member and strung across said raised portion to form an inner wall thereof in opposition to said wall portion.

5. In a windshield cleaner, a metal backing stamped from sheet stock and formed with a raised actuating arm attaching clip portion integral therewith intermediate its ends, said clip portion comprising a unitary member having an arm receiving opening and an adjacent arcuate wall part for nesting into a curved actuating arm tongue, and a leaf spring member strung across said clip portion in opposition to said arcuate wall part and constituting a flat bottom for the tongue-receiving chamber provided within said raised clip portion.

6. A windshield cleaner comprising a holder member formed intermediate its ends with a raised arm receiving housing, said housing being provided with a top wall having an actuating arm receiving opening for inserting an arm therein and with an arcuate wall portion for nestingly receiving a curved arm tongue, means defining a shoulder adjacent the side of said arcuate wall portion opposite said opening for engaging a keeper lug on an arm tongue, and a spring member connected at its ends to said holder member and strung across said raised housing in opposition to said arcuate wall portion to provide the bottom wall of the tongue-receiving chamber within said raised housing.

References Cited in the file of this patent

UNITED STATES PATENTS

| | | |
|---|---|---|
| 2,087,686 | Horton | July 20, 1937 |
| 2,252,510 | Horton | Aug. 12, 1941 |
| 2,274,277 | Rousseau et al. | Feb. 24, 1942 |
| 2,303,694 | Horton | Dec. 1, 1942 |
| 2,596,063 | Anderson | May 6, 1952 |